(12) United States Patent
Rubin et al.

(10) Patent No.: US 8,220,048 B2
(45) Date of Patent: Jul. 10, 2012

(54) NETWORK INTRUSION DETECTOR WITH COMBINED PROTOCOL ANALYSES, NORMALIZATION AND MATCHING

(75) Inventors: Shai Aharon Rubin, Madison, WI (US); Somesh Jha, Madison, WI (US); Barton Paul Miller, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 965 days.

(21) Appl. No.: 11/507,109

(22) Filed: Aug. 21, 2006

(65) Prior Publication Data

US 2008/0047012 A1 Feb. 21, 2008

(51) Int. Cl.
H04L 29/06 (2006.01)

(52) U.S. Cl. .......................................... 726/22; 713/188

(58) Field of Classification Search .................... 726/22; 713/188

See application file for complete search history.

(56) References Cited

U.S. PATENT DOCUMENTS

| 7,810,155 B1 * | 10/2010 | Ravi ................................ 726/22 |
| 2006/0174345 A1 * | 8/2006 | Flanagan et al. ................. 726/24 |
| 2007/0214504 A1 * | 9/2007 | Milani Comparetti et al. . 726/23 |

* cited by examiner

*Primary Examiner* — Eleni Shiferaw
*Assistant Examiner* — Ali Abyaneh
(74) *Attorney, Agent, or Firm* — Boyle Fredrickson, S.C.

(57) ABSTRACT

A network intrusion detection system combines the normally sequential steps of protocol analysis, normalization, and signature matching through the use of a regular expression to speed the monitoring of network data. The regular expression also allows the creation of a superset matcher, permitting multiple stages of matching of increased accuracy to produce additional throughput gains.

16 Claims, 5 Drawing Sheets

NETWORK INTRUSION DETECTOR WITH COMBINED PROTOCOL ANALYSES, NORMALIZATION AND MATCHING

CROSS-REFERENCE TO RELATED APPLICATIONS

Statement Regarding Federally Sponsored Research or Development

BACKGROUND OF THE INVENTION

The present invention relates to network intrusion detectors used to protect computer networks from attack and in particular to a network intrusion detector that provides improved detection of malware disguised through the use of alternate data encodings.

Network intrusion detection systems (NIDS) are systems that attempt to detect malware attacks on computer networks by monitoring network traffic. Malware can be computer viruses, Trojan horses, spyware, adware, denial of service attacks, and other software intended to infiltrate or damage a computer system. An example public domain NIDS system is Snort, a GPL-licensed open source network intrusion detection system written by Martin Roesch and available from Sourcefire of Columbia, Md., US.

A common NIDS uses a database of malware "signatures" identifying known malware. A malware attack is detected by matching the signatures to incoming or outgoing network traffic on a real-time basis. First, the NIDS parses the network traffic according to a protocol specification of the network data, for example, identifying an HTTP method or a URL. Next, the NIDS matches the parsed traffic to signatures within a signature database, each signature which may be keyed to a particular protocol element, for example, providing a signature that relates only to a URL. If a match occurs, in a passive system, the NIDS logs the attack information and provides an alarm to the user. In an intrusion prevention NIDS system, the NIDS also attempts to "log off" the attacker or otherwise block access to the network.

Attackers may attempt to elude detection by a signature-based NIDS by altering the encoding of the malware data so that it no longer matches existing signatures yet is functionally unchanged. This may be done by changing the encoding of the malware in relatively minor ways, for example, by switching upper case characters to lower case, and vice versa or by expressing characters as hexadecimal ASCII values, or by using other encodings recognized by the network computers as equivalent. The alternate encodings avoid a strict match with existing signatures without functionally altering the malware.

NIDS designers have responded to this problem of alternative encodings by employing a "normalization" step in which network traffic is normalized by changing all alternate encodings of each character of the network traffic into an equivalent character in a common encoding set. For example, the normalizing step may convert all network data into lower case characters. Signatures expressed in the common encoding set (e.g., lower case characters) are then applied to the normalized network data.

Protocol analysis and normalization can significantly decrease the throughput of the NIDS. Further, it is difficult to create an a priori normalization system that is efficient and correct.

SUMMARY OF THE INVENTION

The present inventors have recognized that a typical NIDS, performing the three separate steps of protocol analysis, normalization, and signature matching, performs unnecessary duplicate inspections of the network data. Accordingly, the present invention blends the protocol analysis, normalizing and matching process together in a "protomatcher" that effectively interleaves protocol analysis, matching and normalization so that the protocol analysis, normalization, and matching process may share a single inspection of the network data Blending protocol analysis, normalizing and matching together further simplifies the creation of a "superset protomatcher," that is, an NIDS which operates quickly to identify a large proportion, but not all, of the benign traffic. This superset protomatcher is then followed by a more careful signature analysis (possibly, but not necessarily, also a protomatcher) which separates out the remaining benign traffic. The high speed obtainable in the superset protomatcher offsets the added time needed for two steps of signature analyses (superset and regular signature analysis) by significantly reducing the number of data strings that must be subject to two steps of signature analysis.

While the preferred embodiment of the invention provides a combination of protocol analysis, normalization, and signature matching for parallel execution, combinations of protocol analysis and signature matching, or normalization and signature matching can provide similar if lesser benefits and are also contemplated by the present invention.

Specifically then, the present invention provides a network intrusion monitor including a network connection and an electronic memory holding at least one regular expression providing in combination at least one of the processes of: protocol analysis, normalization, together with the process of signature matching to malware strings. An electronic computer communicates with the network and memory and executes a stored program to read a string from the network and applies the string against the regular expression to simultaneously parse and/or normalize and signature match the string. When a match to a malware signature occurs, an output indicating this match is generated.

It is thus one object of the invention to significantly reduce time expended in protocol analysis and normalization of strings by eliminating multiple inspections of the data.

The regular expression may identify a pattern matching at least two different strings. For example, the pattern may match all equivalent encodings of a string under a give protocol or protocol elements associated with portions of the string.

Thus it is an object of the invention to provide a system for combining multiple functions of protocol analysis, normalization and matching. Regular expression, providing sophisticated pattern descriptions, including Boolean connectors and range definitions allow all of these functions to be combined and progressively applied in parallel to network strings.

The pattern matches multiple different malware types.

Thus it is another object of the invention to reduce the number of passes or "reads" of the network data necessary to match network data to multiple malware signatures.

The regular expression may be represented as a deterministic finite state machine incorporating each of the alternative encodings of the malware string.

Thus, it is an object of at least one embodiment of the invention to provide for a compact, yet flexible, implementation of a regular expression.

The finite state machine may include references to secondary state machines stored in memory independently from the finite state machine, the secondary state machines providing protocol analysis, normalization or matching invoked multiple times by the finite state machine.

Thus, it is an object of at least one embodiment of the invention to reduce the need for large amounts of memory, as would be necessary to store reproduce and store common, reoccurring elements of the finite state machine.

The electronic memory may further holds superset regular expressions matching both malware strings and benign strings and wherein the electronic computer first applies the network string against the superset regular expression providing in combination at least two of the processes of: protocol analysis, normalization, and signature matching of each string; and only when the superset regular expression matches the string, proceeding application of the regular expression and otherwise obtaining a new string from the network.

Thus, it is an object of at least one embodiment of the invention to provide for two or more steps of comparison of increasing accuracy to reduce the number of cases when a network string must be fully normalized and matched.

The foregoing objects and advantages may not apply to all embodiments of the invention and are not intended to define the scope of the invention, for which purpose claims are provided.

DETAILED DESCRIPTION OF THE PREFERRED EMBODIMENT

Figure 1:
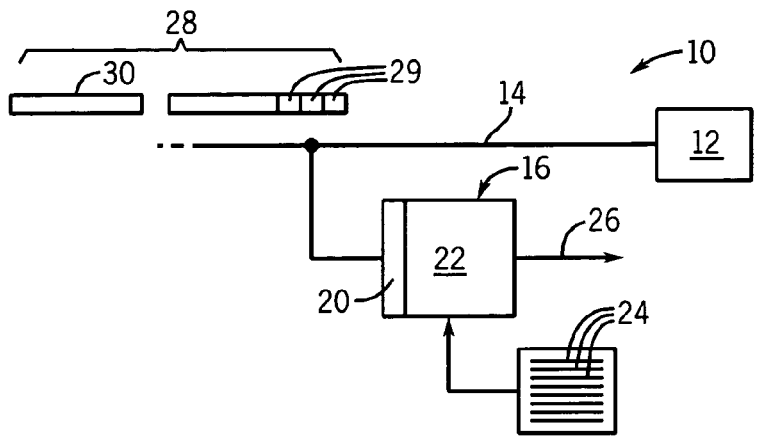
FIG. 1 is a simplified block diagram of a standard NIDS system suitable for use with the present invention.

Referring now to FIG. 1, computer system 10 may include one or more computers 12 attached to a network 14 on which network data 28 comprised of strings 30 of elements 29 (typically bytes) may be received or transmitted. A network intrusion detection system 16 may include a connection to the network 14 to receive and monitor network data 28 for malware strings.

A typical NIDS 16 will include a network protocol pre-processor 20, for example, a TCP/IP stack which orders and assembles packetized data (not shown) according to a particular network protocol into logical strings 30 and a signature detection system 22 that compares the strings 30 to a list of malware signatures 24. When a string 30 matches one signature of the set of stored malware signatures 24, an alarm signal 26 is generated. The alarm signal may be used to provide for active responses, including updating of firewalls, signatures, and/or termination of ongoing network sessions related to the malware.

Figure 2:
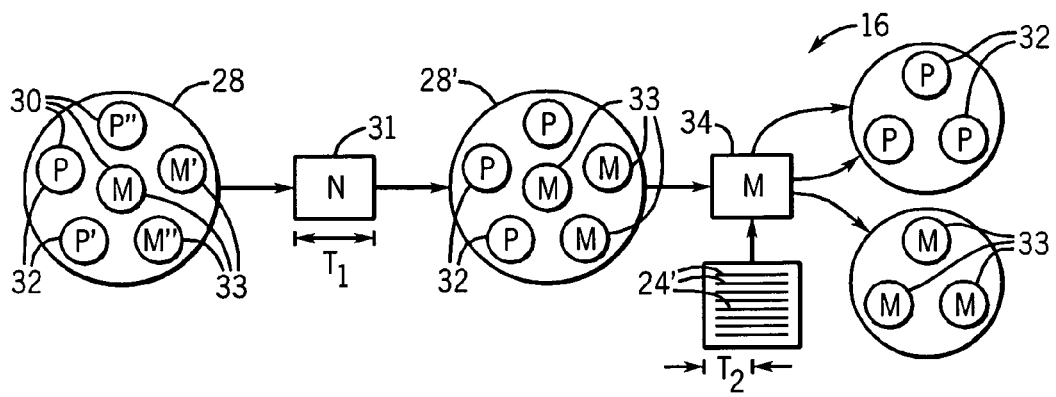
FIG. 2 is a schematic representation of a prior art normalize-then-match NIDS system showing the process of distinguishing between malware and benign network traffic.

Referring now to FIG. 2, in a prior art NIDS, the strings 30 of the network data 28 may include benign strings 32 (e.g. P, P' and P'') and malware strings 33 (e.g. M, M' and M'') wherein P, P' and P''' and M, M' and M'' represent, in this example, alternative encodings of a single logical string P or M. All of these strings were first created by the protocol pre-processor 20 (not shown) which read malware network data and assembled it into parsed strings 30 identified to particular parts of the protocol (e.g. method, URL, etc) This parsing time may be assigned an average parsing time $T_0$. All of these strings 30 are received by a normalizer 31, which reads them for a second time and converts them into normalized benign strings (P) or normalized malicious strings (M), as the case may be, using a single standardized encoding of each character of the strings 30, for example, lower case alphanumeric characters. The result is normalized network data 28' produced with an average time of normalization per string of $T_1$.

The normalized network data 28' is next provided to a matcher 34, which reads the data for a third time and compares each element of the normalized strings 30 to corresponding elements of each signature of a list of normalized malware signatures 24', the normalized signatures also being expressed in the standardized encoding of the normalization. If the normalized string 30 matches at all elements with corresponding elements of at least one normalized malware signature 24', an alarm signal 26 is produced. Otherwise, the normalized string 30 is considered benign.

The time required for the matching process of matcher 34 will typically be dependent on the number of signatures, the length of the strings 30 and how early in the strings 30 a mismatch with a signature occurs, but in a given situation can be assigned an average time of matching of $T_2$. The time required to process each string 30 will thus be $T_0+T_1+T_2$.

Combined Normalization and Signature Matching

Figure 3:
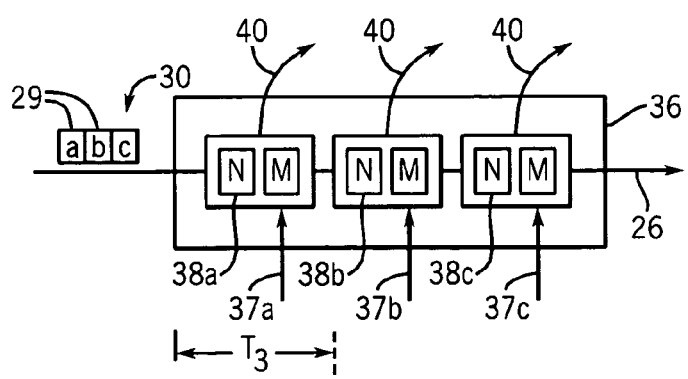
FIG. 3 is a block diagram showing an incremental, blended normalization and matching (normalatching) used by the present invention in lieu of the normalize-then-match process of the prior art.

Referring now to FIG. 3 in a first embodiment of the present invention, the network data 28 is provided to the normalatcher 36, which provides blended normalizing and matching of signatures and strings. In operation, the normalatcher 36 may receive a string 30, for example, having three elements 29 designated a, b and c. At a first step 38a, the normalatcher 36 may normalize and compare the first element a of the string 30 with a corresponding first element 37a of a first malware signature 24. If there is a mismatch, the normalatching process for that signature is terminated as indicated by arrow 40. If there is a match at a second step 38b, the normalatcher 36 may normalize and compare the second element b of the string 30 with a corresponding second element 37b of the first malware signature 24. Again, if there is a mismatch, the normalatching process is terminated, as indicated by arrow 40; but, if there is a match at a third step 38c, the normalatcher 36 may normalize and compare the third element c of the string 30 with a corresponding third element 37c of the first malware signature 24.

If there is a match at third step 38c, an alarm signal 26 is generated indicating that a malware string 33 has been detected. On the other hand, if there is a mismatch at this third step 38c, at which point in this example the entire string has been normalized and compared, the program is exited as indicated by arrow 40, and the process is repeated with the next malware signature 24 from the signature list. If there is a mismatch for all malware signatures 24 in the signature list, the string 30 is considered benign.

Per this example, however, it will be understood that for many benign strings 32, the full three steps 38a-38c will not be completed but the process will terminate early at either step 38a or step 38b. In these cases, normalization of the entire string 30 will have been avoided resulting in an average analysis per string of $T_3$, substantially less than the sum of $T_1$ and $T_2$. An additional time savings may occurs because of the elimination of the multiple "reads" of the data. The inventors have determined that, in certain circumstances, over 20% improvement in average per string analysis time can be had over the system described with respect to FIG. 2.

Figure 4:
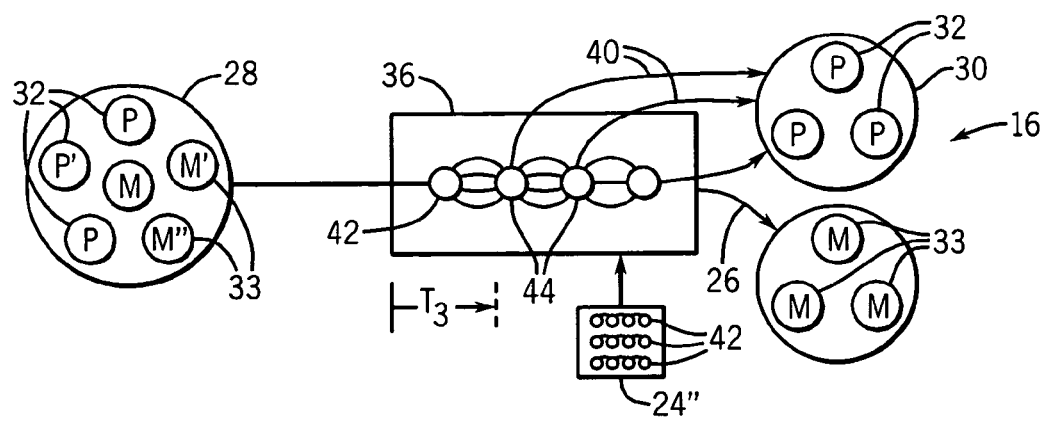
FIG. 4 is a figure similar to that of FIG. 2 showing an example implementation of the normalatcher employing state machine signatures.

Referring now to FIG. 4, each of the normalatching steps of 38a, 38b and 38c may implemented using regular expressions embodied as a set of deterministic finite state machines 42, each forming a malware signature 24", each being a different state machine representing a particular class of malware. Alternatively, a single state machine can represent all malware signatures. In the former case, each state machine 42 provides a set of defined states 44 and a transition between those states 44 (indicated by line joining the states 44). Such state machines are well known in the art, and may be implemented in a variety of scripts or computer languages which can be loaded from the list of signatures and used to guide the normalatching process in a method analogous to standard signature matching but where the state machine 42 controls the matching and normalization process.

Figure 5:
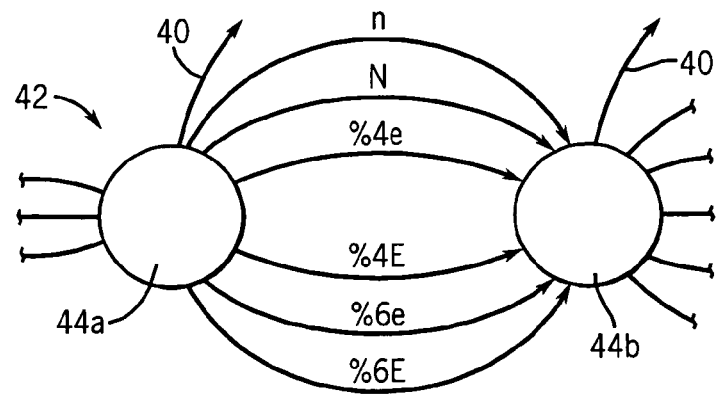
FIG. 5 is a fragmentary representation of a simple state machine signature used in the normalatcher of FIG. 3 and showing state transitions between two elements of the state machine signature.

Referring to FIG. 5, an example state machine 42 may have two states 44a and 44b (among others) defining the normalization and matching of sequential given elements of a string 30. In this example, the state machine 42 analyzes at state 44a whether the element 29 of a string 30 is the character "N" in any of a variety of alternative encodings including: "n," "N," "%4e," "%4E," "%6e," and "%6E," where "4E" is the ASCII representation of "n" and "6E" is the ASCII representation of "N". State 44a transitions to state 44b only if one of these forms is detected; otherwise, the normalatching of this state machine 42 is terminated per arrow 40.

It will be understood that signatures of arbitrary length can be created through the chaining of sufficient state 44 together with similar state transitions.

Figure 6:
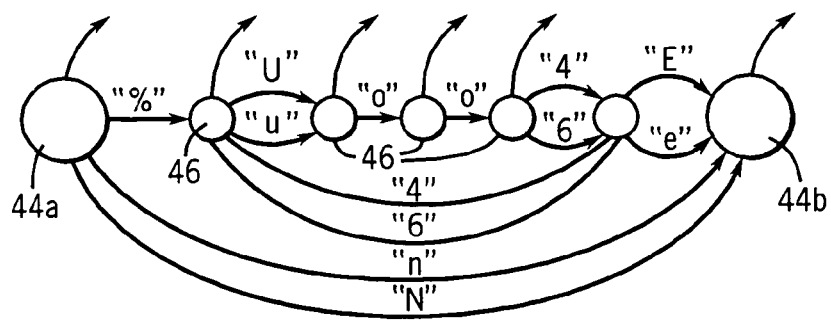
FIG. 6 is a figure similar to that of FIG. 4 showing a more complex state machine signature.

Referring now to FIG. 6, a more complex state machine may be shown for capturing alternative encodings of the letter "U" as uppercase, lowercase, hexadecimal encoded ASCII, or as a Uuencode, in which the ASCII numeral is preceded by the string "%u00". In this case, intervening states 46 are created to capture the mapping of multiple characters to a single alternative encoding. Thus, for example, the character string "%u004e" maps to the single alternative encoding of "u".

Figure 8:
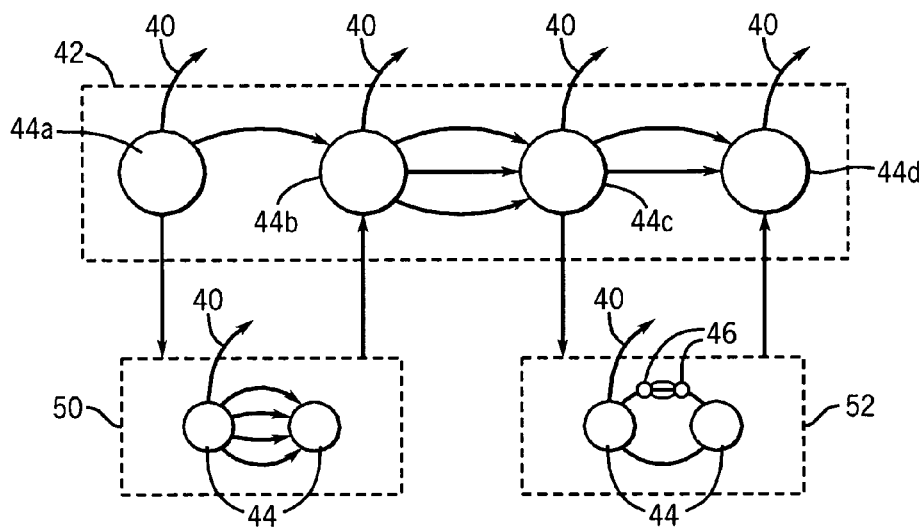
FIG. 8 is a pictorial representation of a method of storing the normalized signatures in memory so as to improve memory usage.
Figure 9:
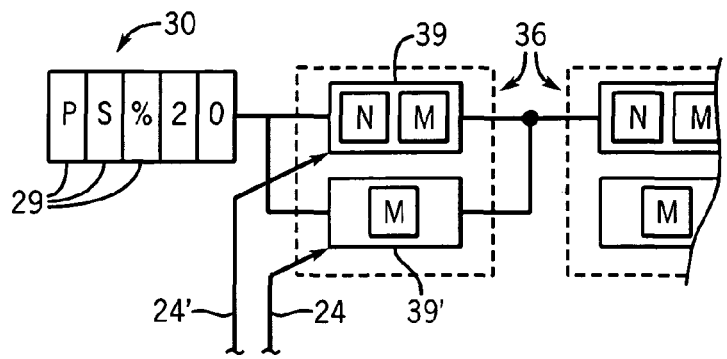
FIG. 9 is a figure similar to that of FIG. 3 showing an implementation of the normalatcher that better resists algorithmic attacks.

Some mappings, such as that just described, will be used repeatedly in different state machines 42, consuming significant amounts of memory within the signature list. This memory usage can be moderated through the implementation of a hierarchical normalatcher. Referring to FIG. 8, in such a system, a primary state machine 42 may be generated having multiple states 44a through 44d, each corresponding generally to one logical element 29 of a malware string 33. Any state, for example state 44a, may reference a secondary state machine 50 that, for example, provides for an analysis of all the alternative encodings of the letter "A". The secondary state machine 50 performing this task thus need not be stored with each malware signature 24, but may be stored commonly to save memory. More complex secondary state machines 52, for example, ones that analyze a three-digit string (e.g., "%20") as a space character, are also possible.

Figure 7:
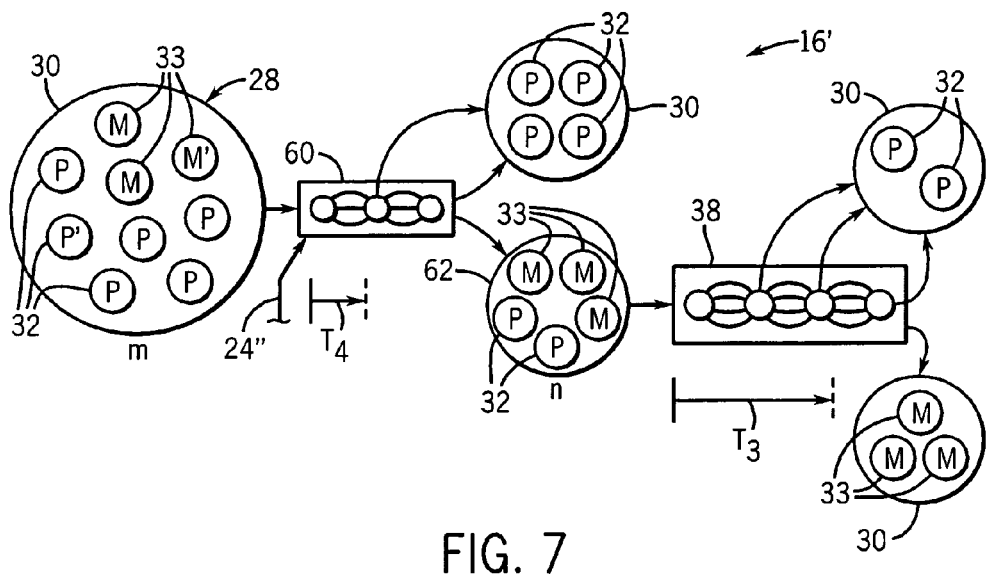
FIG. 7 is a figure similar to that of FIG. 3 showing a second embodiment of the invention employing a two-stage matching process, such as may use normalatchers in the first and/or second stage.

Referring now to FIG. 7, the normalatcher described above provides one method of implementing a multi-stage NIDS 16' that may further increase the efficiency of the normalizing process. In such a system, network data 28, including m variations of malware strings 33 and benign strings 32, is provided to a superset matcher 60 employing a "less specific" malware signature 24". Less specific signatures provide some false-positive matches (i.e. identifying benign strings 32 as malware strings 33), but operate more quickly to provide higher throughput to analyze network data 28. One method of producing a less specific string is to omit some states of the state machines 42 described above, those associated with particular standard encodings. That is, instead of a state machine that normalatches each of the elements of "attack," a less specific state machine can be created that normalatches only "tack". This latter state machine will perform its normalatching faster because there are fewer elements to normalize and match and will use less memory.

The superset matcher 60, which need not be a normalatcher, reviews the m variations of malware strings 33 and benign strings 32 to identify a mixed set 62 of malware strings 33 and benign strings 32 of total number n<m. This mixed set 62 may then be operated on by a standard matcher 39' (which may, but need not, be a normalatcher) to sort the remaining benign strings 32 from the malware strings 33.

The superset matcher 60 may operate more quickly than the matcher 39', as noted above, to provide an average processing time per string $T_4$ in comparison to the processing time $T_3$ of the matcher 39'. Yet the multi-stage NIDS 16' may provide improved throughput to the extent that $(m*T_4)+(n*T_3)<(m*T_3)$. Additional stages of increasingly specific signatures could also be used.

Combined Protocol Analysis, Normalization, and Signature Matching

The basis principles described above may be also applied to a system that combines the protocol analysis of the network protocol pre-processor 20 with signature matching, also preventing unnecessary redundant readings of the network data and eliminating full protocol analysis when the matching step indicates a mismatch.

Figure 10A:
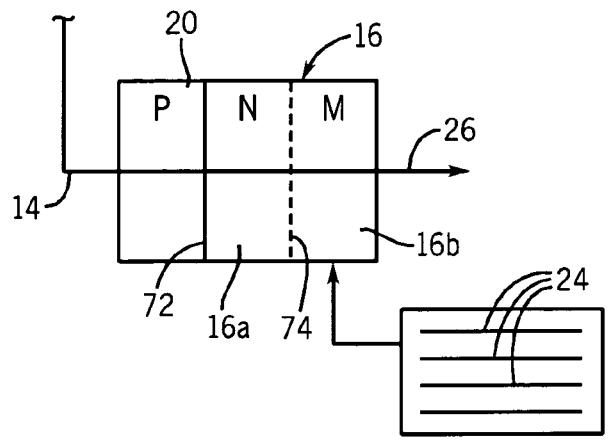
FIG. 10a-c is a set of block diagrams similar to FIG. 1 showing an extension of the normalatching approach to include protocol analysis of network traffic.

An even greater improvement can be obtained by combining the protocol analysis, normalization, and signature matching. Referring now to FIGS. 1 and 10a, as noted above, a prior art implementation of a typical NIDS 16 will include a network protocol pre-processor 20 which orders and assembles packetized data according to a particular network protocol into logical strings associated with particular protocol elements. Thus, for example, HTTP data may be parsed into a set of fields including a method (such as GET or POST), an address or URL, as well as other fields of HTTP version number, character encoding, etc. The parsed data is then stored in a buffer as indicated by line 72, which represents both a storage (and later recovery) operation and a point of process division. Each of these parsed fields may then be read from the buffer and normalized by a normalizing program 16a. The normalizing program 16a converts the string elements into their normalized form and again stores them as indicated by line 74 for reference by latter programs. In particular, the normalized data is read from the buffer and matched by a matcher 16b against a list of text string malware signatures 24. Up to three separate inspections (two if parsing and normalization are combined) are required by this system.

Figure 10B:
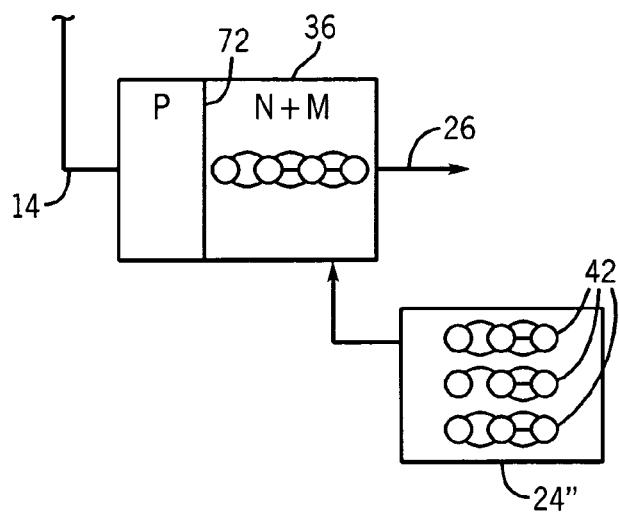

Referring to FIG. 10b, the normalatcher 36 of the present invention, as described above, combines the normalization and the matching to reduce the number of inspections of data that are required to a single buffering indicated by line 72. This combination of normalization and matching is made possible by malware signature 24" in the form of deterministic finite state machines 42, as described above.

Figure 10C:
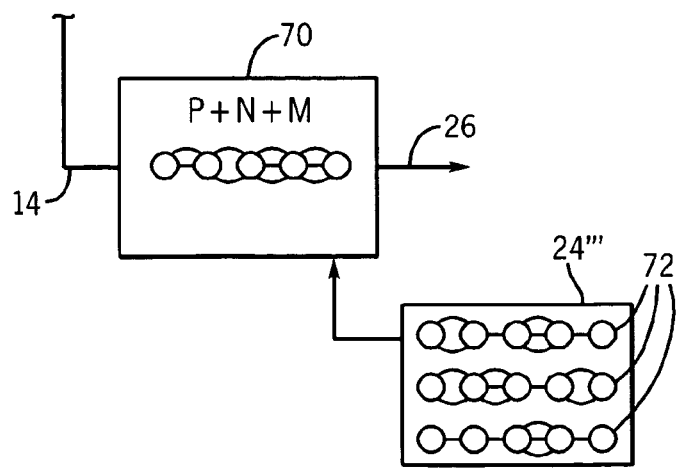

Referring to FIG. 10c, this approach may be extended into the protocol analysis of the network data to create a protomatcher 70 that combines protocol analysis, normalization, and matching into one, eliminating multiple inspections of the data. This combination of protocol analysis, normalization, and matching requires only a simple extension of the deterministic finite state machines 42 to include identification of protocol elements or fields.

Thus, for example, signature 24''' used to detect the URL "dnstools.php" in an HTTP GET request may provide a deterministic finite state machines 42 detecting all alternative encodings of "GET" followed by at least one space, followed by all alternative encodings of "www.dnstools.php" using the character substitutions described above. As will be understood, this deterministic finite state machine 42 effectively identifies the protocol element without a separate parsing step being insensitive to the use of the string "dnstools.php" outside of the URL and, for example, in a POST request.

Figure 11:
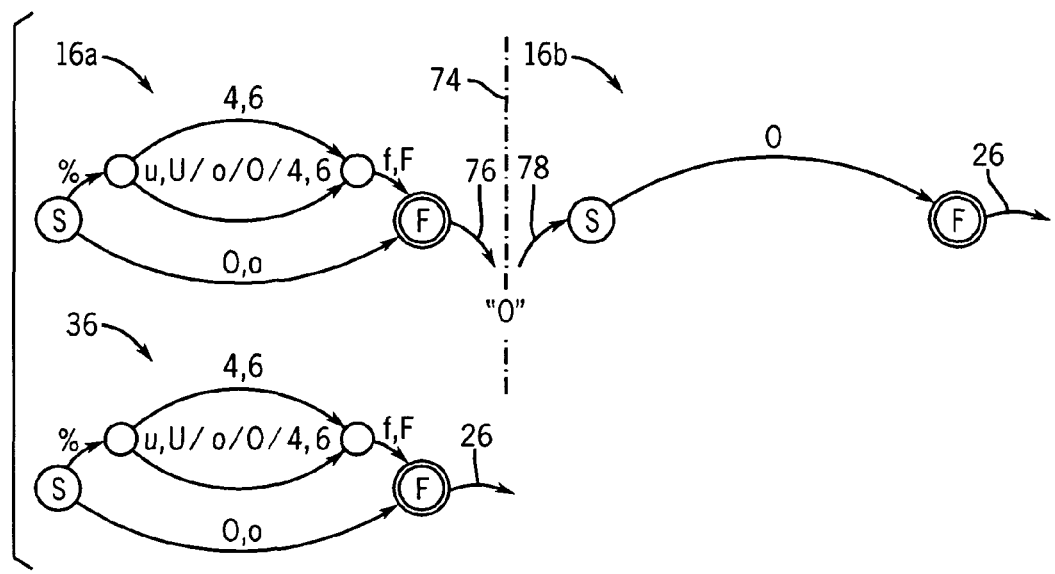
FIG. 11 is a figure similar to that of FIG. 5, showing a simplified comparison of a sequential and parallel of protocol analysis, normalization and matching to signatures, showing the reduction of data buffering.

Referring to FIG. 11, the time saving resulting from the combination of protocol analysis, normalization and signature matching can be understood by reference to a simple normlatching example in which the letter "O" is to be detected (matched to a malware string). A prior art system may employ separate normalization programs 16a and matching programs 16b (here, for clarity in comparison, shown as finite state machines). The normalization program 16a detects variations in the letter "O" (e.g., "o", "% 6F", etc.) and if detected, writes the normalized form of "O" to a buffer in a writing process 76.

The normalized string (in this case "O") is then read by the matching program 16b which matches it to a malware signature, to produce an alarm signal 26 as described above. Generally, of course, the network data will be many bytes long and the signature will be many characters. The buffering allows coordination of the normalization process and the matching process when the normalization maps multiple characters into a single character.

In contrast, the present invention provides a single normalatcher 36 (or protomatcher 70) that combines normalization and matching in a single parallel process. Gone are the intervening buffer writing 76 and reading 78 and further the unnecessary steps of converting for example "% 6F" to "O" only to match "O" to an "O" signature in a later set of steps. With the normalatcher 36, the detection of "% 6F" immediately leads to the generation of a match and an alarm signal 26.

The storage of these more complex deterministic finite state machines 42 may be made more compact using the secondary state machine techniques described above with respect to FIG. 8. The protomatcher 70 may further be used in a superset matching process described with respect to FIG. 7 in which the signatures 24''' are truncated to provide a rapid identification of benign data in a superset matching process and then a more complete set of signatures 24''' or standard signature analysis techniques used to analyze the smaller set of positive matches from the superset matcher.

The use of the term "regular expression" herein is not intended to require any specific syntax but to embrace any sophisticated pattern description allowing the implementation of combined functions of normalization etc., described above. It is specifically intended that the present invention not be limited to the embodiments and illustrations contained herein, but that modified forms of those embodiments, including portions of the embodiments and combinations of elements of different embodiments, may also be included as come within the scope of the following claims.

We claim:

1. A network intrusion monitor comprising:
   a network connection receiving data strings;
   an electronic memory holding a plurality of regular expressions, each regular expression providing in combination at least one of the processes of: protocol analysis and normalization, together with the process of matching to malware signatures, a match of a data string with the regular expression indicating that the string is a portion of a malware data string;
   an electronic computer communicating with the network and memory and executing a stored program to:
   read a string from the network;
   apply the string against a regular expression, in one processing of the string, to provide each of the processes of: a protocol analysis and normalization, together with the process of matching to malware signatures to detect a match without separate readings of the string from the network for the separate processes; and
   output an alarm signal indicating when the string has matched to a malware signature as indicated by the match;
   wherein the electronic memory further holds superset regular expressions matching both known malware strings and known benign strings and wherein the electronic computer after reading a string from the network and before applying the string against the regular expression executes the stored program to:
   apply the string against the superset regular expression in one processing of the string to provide in combination each of the processes of: protocol analysis, normalization, and signature matching of the string; and
   when the superset regular expression matches the string, proceeding to the step of applying the string against the regular expression and otherwise returning to the step of reading a string from the network for a new string from the network.

2. The network intrusion monitor of claim 1 wherein the regular expression identifies a pattern matching at least two different strings.

3. The network intrusion monitor of claim 2 wherein pattern matches all equivalent encodings of a string under a given protocol.

4. The network intrusion monitor of claim 2 wherein pattern identifies protocol elements associated with the string.

5. The network intrusion monitor of claim 2 wherein the pattern matches multiple different malware types.

6. The network intrusion monitor of claim 2 wherein the pattern matches both known benign and known malicious strings.

7. The network intrusion monitor of claim 1 wherein the regular expression is implemented as a finite state machine.

8. The network intrusion monitor of claim 7 wherein the finite state machine includes references to secondary state machines stored in memory independently from the finite state machines, the secondary state machines providing one of protocol analysis, normalization or matching that may be invoked by multiple finite state machines.

9. A method of network intrusion monitoring comprising the steps of:
reading a string from the network with an electronic computer executing a stored program;
further executing the stored program on the electronic computer to apply the string to a regular expression stored in an electronic memory, in one processing of the string, to provide each of the processes of: protocol analysis and normalization, together with the process of matching against malware signatures without separate readings of the string for the separate processes, a match of the string with the regular expression indicating that the string is a portion of a malware data string; and
outputting from the electronic computer an alarm signal indicating when the string has matched to a malware signature;
wherein the electronic memory further holds superset regular expressions matching both known malware strings and known benign strings and wherein the electronic computer after the step of reading a string from the network and before the step of applying the string against the superset regular expression executes the stored program to:
(a) apply the string against the superset regular expression in one processing of the string to provide in combination each of the processes of: protocol analysis, normalization, and signature matching of the string; and
(b) when the superset regular expression matches the string, proceeding to the step of applying the string against the superset regular expression and otherwise returning to the step of reading a string from the network for a new string from the network.

10. The method of claim 9 wherein the regular expression identifies a pattern matching at least two different strings.

11. The method of claim 10 wherein pattern matches all equivalent encodings of a string under a given protocol.

12. The method of claim 10 wherein pattern identifies protocol elements associated with the string.

13. The method of claim 10 wherein the pattern matches multiple different malware types.

14. The method of claim 10 wherein the pattern matches both known benign and known malicious strings.

15. The method of claim 9 wherein the regular expression is implemented as a finite state machine.

16. The method of claim 15 wherein the finite state machine includes references to secondary state machines stored in memory independently from the finite state machine, the secondary state machines providing one of protocol analysis, normalization or matching that may be invoked multiple times by the finite state machine.

* * * * *

UNITED STATES PATENT AND TRADEMARK OFFICE
CERTIFICATE OF CORRECTION

| | | |
|---|---|---|
| PATENT NO. | : 8,220,048 B2 | Page 1 of 1 |
| APPLICATION NO. | : 11/507109 | |
| DATED | : July 10, 2012 | |
| INVENTOR(S) | : Shai Aharon Rubin et al. | |

It is certified that error appears in the above-identified patent and that said Letters Patent is hereby corrected as shown below:

IN THE SPECIFICATION:

Column 1, line 8, insert -- This invention was made with government support under N00014-01-1-0708 awarded by the NAVY/ONR. The government has certain rights in the invention. --

Signed and Sealed this
Twenty-eighth Day of August, 2012

David J. Kappos
*Director of the United States Patent and Trademark Office*